US012593134B2

(12) United States Patent (10) Patent No.: US 12,593,134 B2
Gupta (45) **Date of Patent: \*Mar. 31, 2026**

(54) CYLINDRICAL PANORAMA HARDWARE

(71) Applicant: GN AUDIO A/S, Ballerup (DK)

(72) Inventor: Yashket Gupta, Santa Clara, CA (US)

(73) Assignee: GN AUDIO A/S (DK)

( \* ) Notice: Subject to any disclaimer, the term of this patent is extended or adjusted under 35 U.S.C. 154(b) by 0 days.

This patent is subject to a terminal disclaimer.

(21) Appl. No.: 18/459,586

(22) Filed: Sep. 1, 2023

(65) Prior Publication Data

US 2023/0421906 A1 Dec. 28, 2023

Related U.S. Application Data

(63) Continuation of application No. 16/372,302, filed on Apr. 1, 2019, now Pat. No. 11,856,297, which is a continuation-in-part of application No. 14/986,555, filed on Dec. 31, 2015, now abandoned.

(60) Provisional application No. 62/098,338, filed on Dec. 31, 2014.

(51) Int. Cl.
| | |
|---|---|
| *H04N 23/698* | (2023.01) |
| *G06F 9/30* | (2018.01) |
| *G06T 3/4038* | (2024.01) |
| *G06T 7/73* | (2017.01) |
| *H04N 23/45* | (2023.01) |
| *H04N 23/90* | (2023.01) |

(52) U.S. Cl.
CPC ......... *H04N 23/698* (2023.01); *G06F 9/3004* (2013.01); *G06T 3/4038* (2013.01); *G06T 7/73* (2017.01); *H04N 23/45* (2023.01); *H04N 23/90* (2023.01)

(58) Field of Classification Search
None
See application file for complete search history.

(56) References Cited

U.S. PATENT DOCUMENTS

| | | | |
|---|---|---|---|
| 5,657,073 A | 8/1997 | Henley | |
| 5,963,213 A | 10/1999 | Guedalia et al. | |
| 6,256,058 B1 | 7/2001 | Kang et al. | |
| 2007/0109398 A1 | 5/2007 | Teo | |
| 2008/0056612 A1 | 3/2008 | Park et al. | |
| 2010/0054628 A1 | 3/2010 | Levy et al. | |
| 2012/0019613 A1* | 1/2012 | Murray | H04N 13/106 |
| | | | 348/36 |
| 2012/0062695 A1 | 3/2012 | Sakaki | |
| 2012/0155786 A1 | 6/2012 | Zargarpour et al. | |
| 2012/0243746 A1 | 9/2012 | Higashimoto | |
| 2012/0287222 A1 | 11/2012 | Liu et al. | |
| 2012/0300020 A1 | 11/2012 | Arth et al. | |
| 2013/0141526 A1 | 6/2013 | Banta et al. | |

(Continued)

*Primary Examiner* — Mohammed Jebari

(74) *Attorney, Agent, or Firm* — Vani Moodley, Esq.

(57) ABSTRACT

A panoramic video camera comprises a plurality of image sensors which are configured to capture a plurality of frames at a time; an image processing circuitry configured to generate a frame read signal to read the plurality of frames generated by the plurality of camera sensors, apply a cylindrical mapping function to map the plurality of frames to a cylindrical image plane and stitch the cylindrically mapped plurality of frames together in the cylindrical image plane based on a plurality of projection parameters.

19 Claims, 6 Drawing Sheets

(56)            References Cited

U.S. PATENT DOCUMENTS

| | | | |
|---|---|---|---|
| 2016/0086379 A1* | 3/2016 | Sadi | G02B 27/0093 |
| | | | 345/633 |
| 2016/0198088 A1 | 7/2016 | Wang et al. | |
| 2016/0286137 A1* | 9/2016 | Marks | H04N 5/265 |
| 2017/0166126 A1* | 6/2017 | Sypitkowski | G06T 7/0002 |
| 2019/0082103 A1* | 3/2019 | Banerjee | G06T 7/292 |
| 2019/0272619 A1* | 9/2019 | Lim | H04N 23/698 |
| 2020/0104977 A1* | 4/2020 | Su | G06T 7/30 |

\* cited by examiner

CYLINDRICAL PANORAMA HARDWARE

FIELD

Embodiments of the invention relate generally to multiple imager video systems that produce panoramic images through a process of stitching multiple images together.

BACKGROUND

Cylindrical panorama can be captured by anyone with a camera and a tripod capable of continuous panning. To avoid a parallax problem in the reproduced panorama, a fixture is placed between the camera and the tripod such that the camera can be rotated around the nodal point. To avoid tedious manual process, motorized high precision rotating gigs are commercially available. The multiple perspective images captured are to be stitched and projected to a cylindrical panorama.

Instead of using a 2D perspective camera, a rotating 1D slit-scan camera can be used to produce cylindrical panorama directly without complicated registration and stitching process. However, such setup is only suitable for capturing static landscape panorama.

To produce high quality panorama video, requires capturing synchronized multiple images simultaneously at the video rate.

SUMMARY

According to a first aspect of the invention imaging hardware is provided. The imaging hardware comprises a plurality of image sensors; a circuit for executing a geometric correction function; a circuit for applying a cylindrical mapping function to map the images from the plurality of sensors to a cylindrical image plane; and a circuit to stitch images from the plurality of sensors together in the cylindrical image plane based on a seam cost function.

Other aspects of the invention will be apparent from the detailed description below.

BRIEF DESCRIPTION OF THE DRAWINGS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

The present invention, in accordance with one or more various embodiments, is described in detail with reference to the following figures. The drawings are provided for purposes of illustration only and merely depict exemplary embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Figure 1:
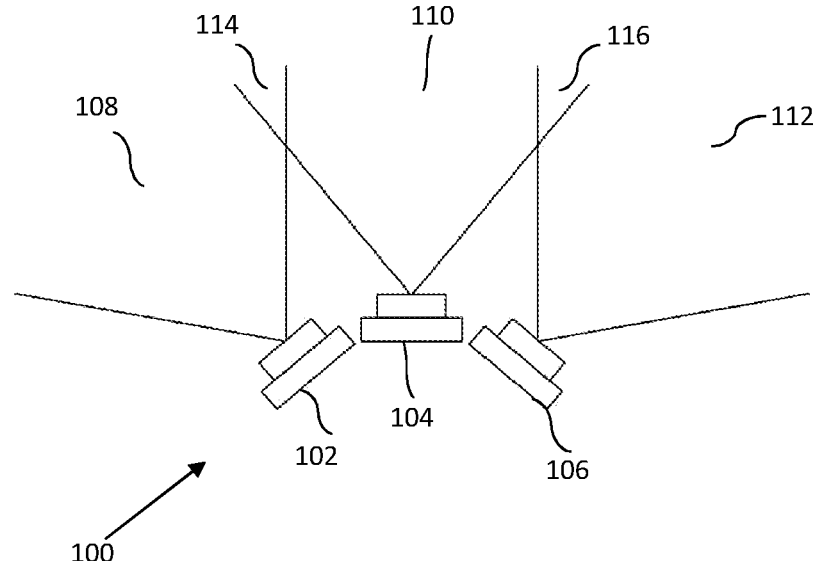
FIG. 1 shows a schematic drawing of a panoramic video camera, in accordance with one embodiment.

FIG. 1 shows a schematic drawing of a panoramic video camera 100, in accordance with one embodiment. The camera comprises three sensors indicated by reference numerals 102-106. The sensor 102 is rotated 55 degrees relative to the sensor 104. Likewise, the sensor 106 is rotated 55 degrees relative to the sensor 106. The reference numeral 108 indicates the field-of-view (FOV) for the sensor 102, reference numeral 110 indicates the field-of-view (FOV) for the sensor 104, and reference numeral 112 indicates the field-of-view (FOV) for the sensor 106. Reference numeral 114 indicates a region of overlap between the FOVs of sensors 102 and 104. Reference numeral 116 indicates a region of overlap between the FOVs of sensors 104 and 106.

Figure 2:
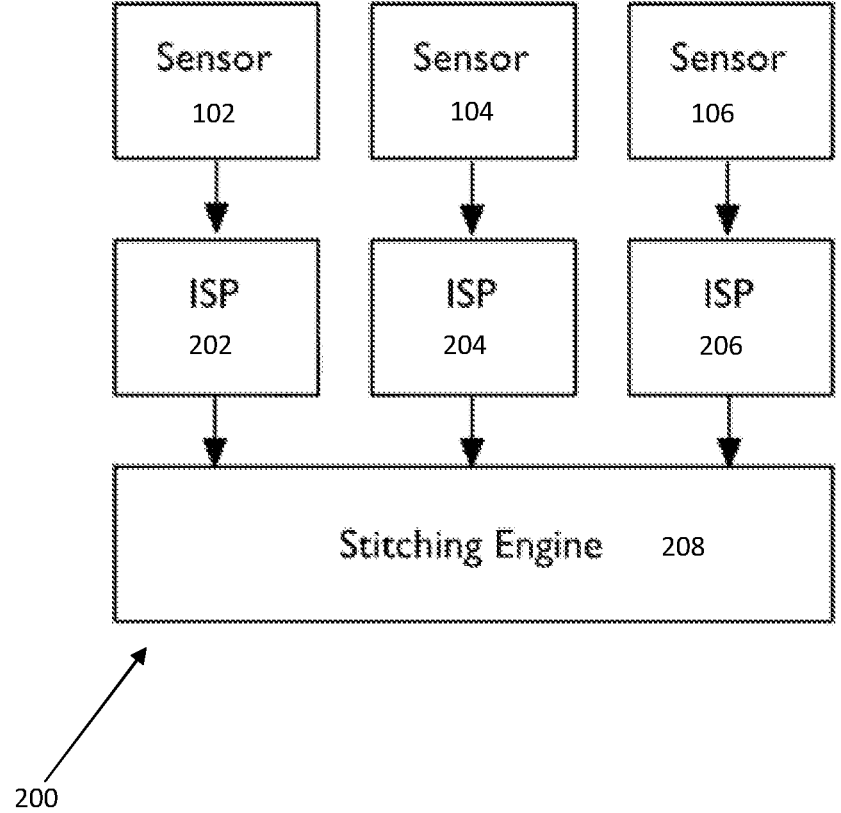
FIG. 2 is a schematic showing the camera architecture of FIG. 1.

FIG. 2 shows a schematic of the camera architecture 200 of FIG. 1. The images captured by the image sensors 102-106 are processed by the corresponding image sensor processors 202, 204, 206. The image sensor processors 202, 204, 206 can also be implemented as a single processor capable of processing frames from multiple sensors. The frames captured by the sensors 102-106 are stitched by the stitching engine 208 by using the stitching techniques as described in co-pending U.S. patent application Ser. No. 13/902,186, filed on May 24, 2013 and entitled "Dynamic Stitching for a Multiple Imager Video System", and U.S.

patent application Ser. No. 13/902,136 filed on May 24, 2013 and entitled "Locally Adaptive Luminance and Chrominance Blending in a Multiple Imager Video System" and U.S. patent application Ser. No. 13/902,248 filed on May 24, 2013 and entitled "Stitching for a Multiple Imager Video System Based On A Non-Linear Seam" which are hereby incorporated by reference.

Figure 3:
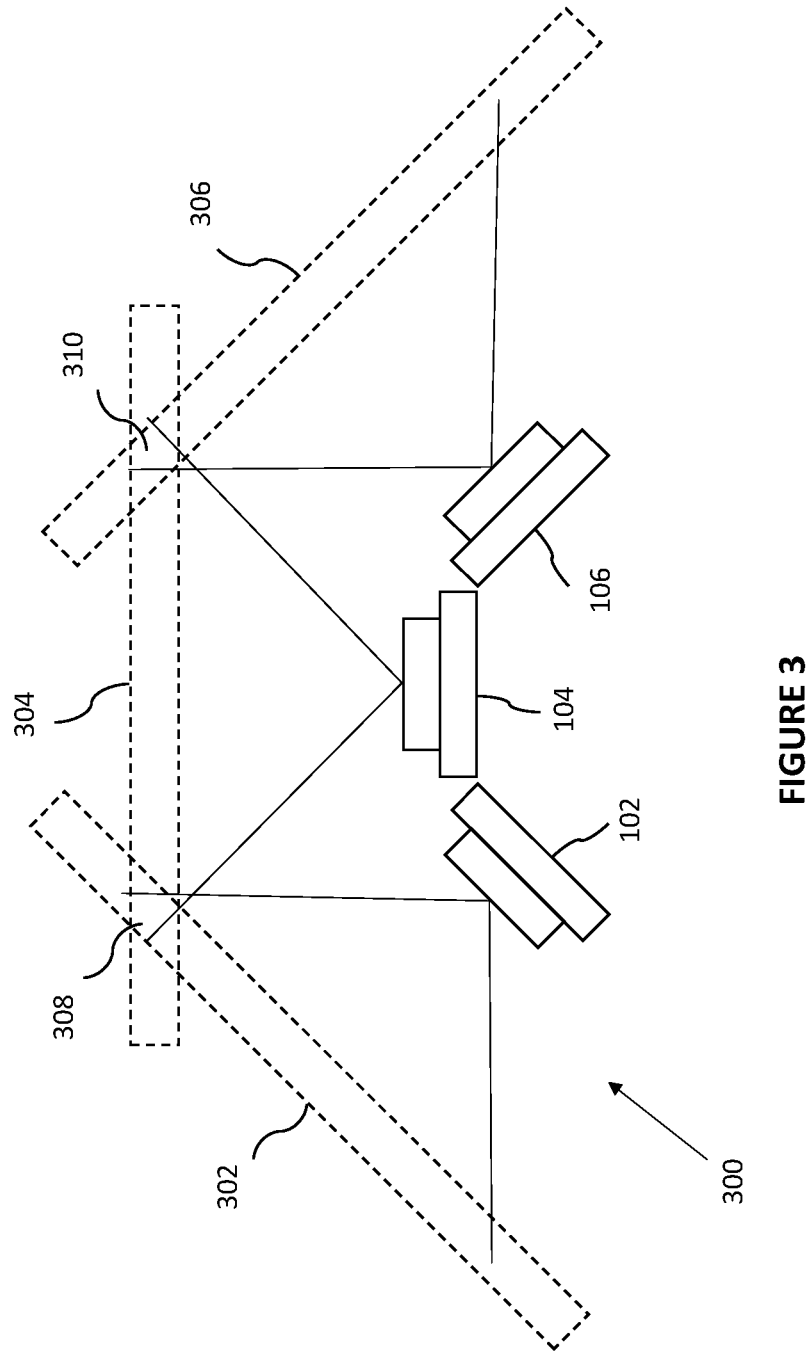
FIG. 3 shows a schematic drawing of the interaction of image planes of the sensors of FIG. 1.

FIG. 3 shows a schematic drawing of the interaction of image planes 300 of the sensors of FIG. 1. The images planes 302, 304, 306 corresponds to the three image planes for the three sensors 102-106 of FIG. 1. The image planes 302 and 304 overlap and intersect at 308 and image planes 304 and 306 overlap and intersect at 310. As will be seen the images intersect at sharp angles.

Figure 4:
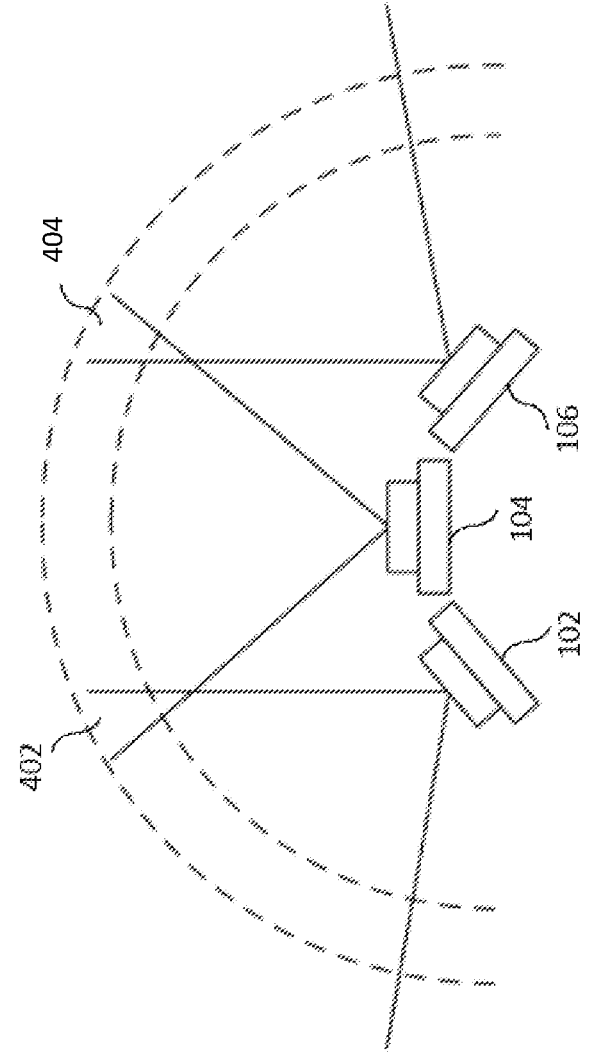
FIG. 4 is a projection of the image planes of each the sensors of the camera of FIG. 1 onto a cylindrical plane, in accordance with one embodiment of the invention.

FIG. 4 shows a projection of the image planes of each the sensors of the camera of FIG. 1 onto a cylindrical plane. The cylindrical panorama images are generated by using the techniques as described in co-pending U.S. patent application Ser. No. 14/757,716, file on Dec. 23, 2015 and entitled "CYLINDRICAL PANORAMA", which is hereby incorporated by reference. The overlap region 308 and 310 of FIG. 3 are projected as 402 and 404 after cylindrical projection of each sensor image plane.

Figure 5:
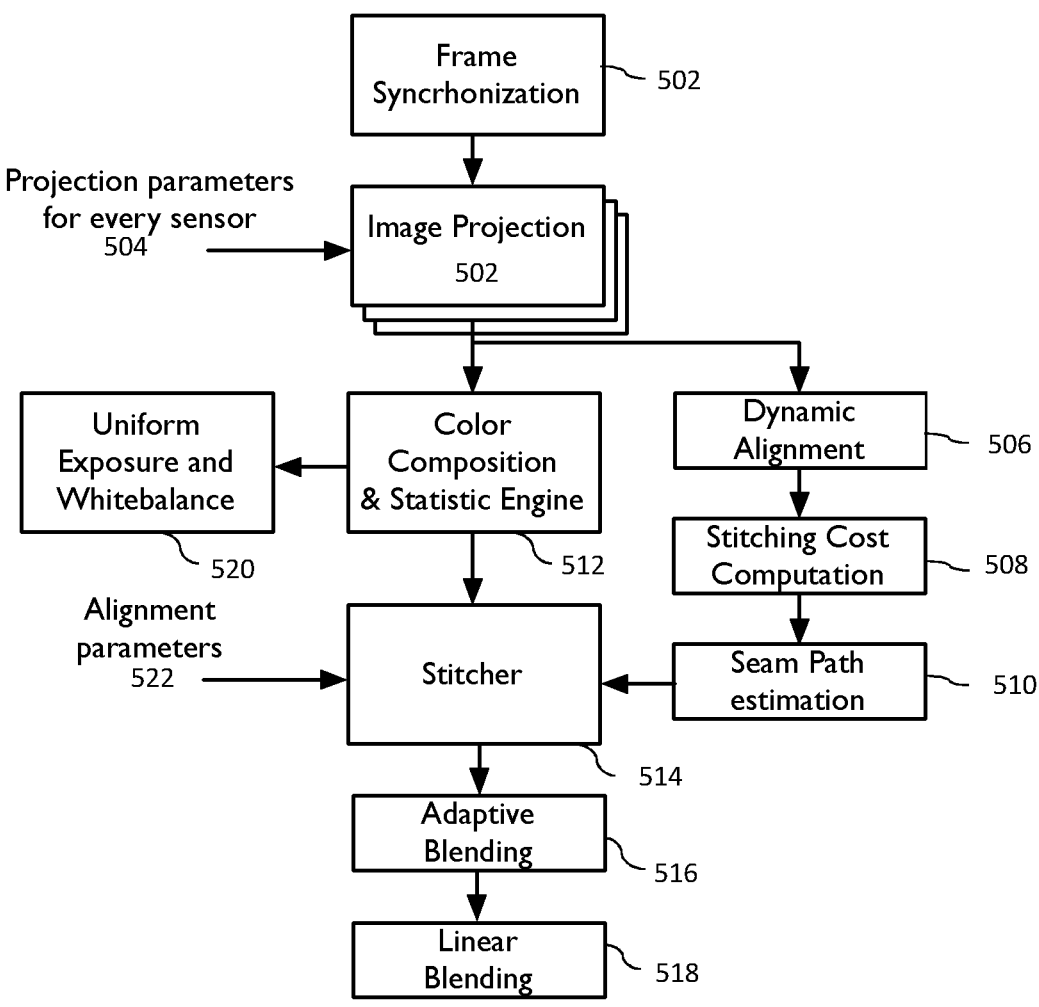
FIG. 5 shows a flow diagram of an image stitching pipeline, in accordance with one embodiment of the invention.

FIG. 5 is a flow diagram of an image stitching pipeline.

The panoramic image streams are created using stitching techniques described in co-pending U.S. patent application Ser. No. 13/902,248, filed on May 24, 2013, and entitled "STITCHING FOR A MULTIPLE IMAGE OR VIDEO SYSTEM BASED ON A NON-LINEAR SEAM", which is hereby incorporated by reference. The blending block 52 performs blending across the seam path.

The multiple camera system of FIG. 1 includes multiple sensors with corresponding lens element. Pixel data from each sensor is processed by an Image Sensor Processor (ISP). The panoramic camera system may have a single ISP, which aggregates the pixel data from all the sensors, or a single ISP which may be paired up with each sensor for pixel processing.

In order to stitch video frames from multiple sensors, it is important to synchronize the camera system. The frame synchronization step 502 of the camera system may be achieved using various techniques as described in the disclosure.

A common master processor may be used to generate frame read signals for ISP to read the frame data from the multiple sensors in synchronization. The sensors read out function may also be controlled through switch which is initialized by the multiple sensors over the sensor control interface by broadcasting the control to the multiple sensors. Reading the frames through a memory buffer can also synchronize the video frames from the sensors.

In step 504 is to generate alignment and projection parameters for the frames read from the multiple sensors. In an embodiment, two different types of calibrations may be used, factory calibration and runtime calibration.

Factory calibration is required in order to effectively stitch the video by addressing the parallax disparity that are present in multiple cameras looking at the same object from a different point of view. The device is designed with known FOV of each camera and the amount of overlapping FOV between the multiple cameras. In an embodiment, the camera system may have three cameras sensors, during the factory calibration process two sets of overlap parameters and three sets of cylindrical warp parameters are determined. In an embodiment, the parameters estimated are: the horizontal overlap in pixels between two adjacent imagers, the vertical offset in pixels and a set of cylindrical warp parameters for each camera sensor. The overlap is estimated on cylindrically warped images from the cameras.

Figure 6:
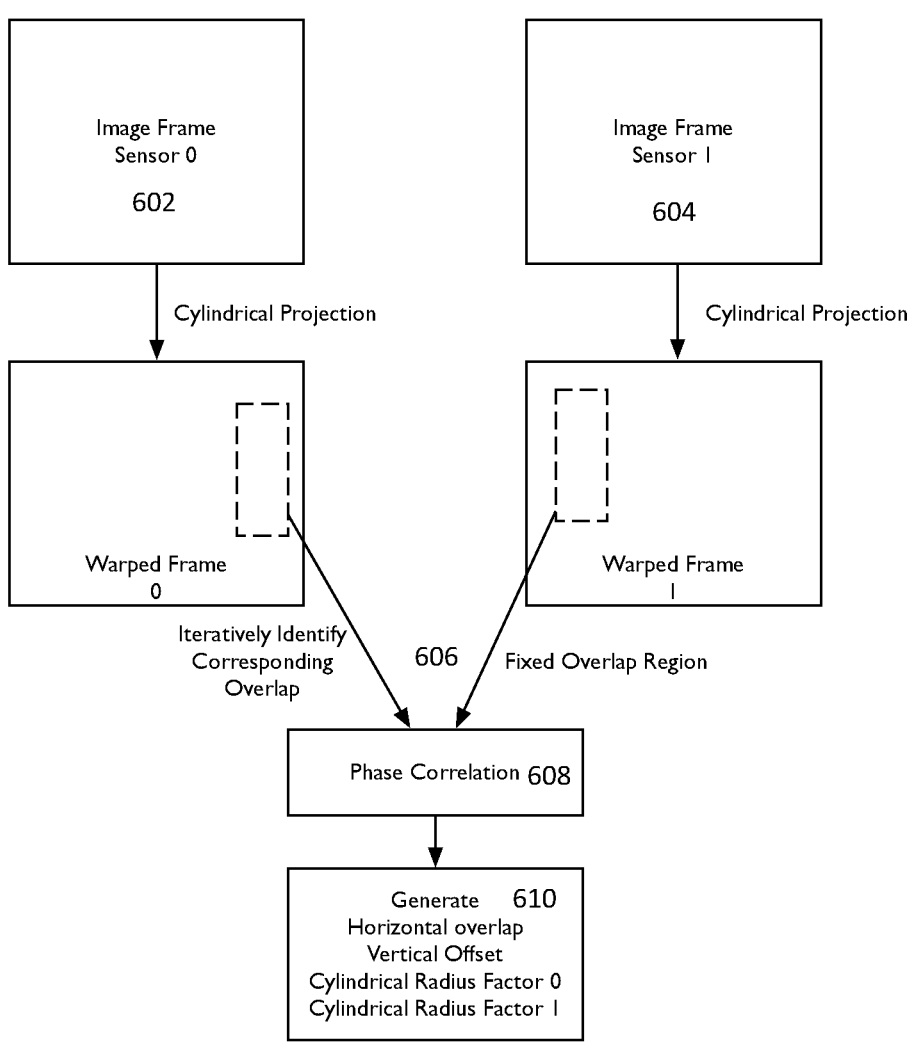
FIG. 6 illustrates a process for calibration in accordance with one embodiment of the invention.

Referring to FIG. 6 which describes the generation of factory calibration parameters. The left frame 602 and right frame 604 are cylindrically warped using the cylindrical projection techniques. The common overlap region 606 is identified using a technique called phase correlation 608. A scale is determined for the left overlap region to match the right overlap region. The scale is converted to a quantity called the cylindrical radius factor, which modulates the cylindrical warp parameters individually for each frame. Finally, in step 610 sets of values are determined: the horizontal overlap, the vertical offset and the individual cylindrical radius factors. The steps for determining the factory parameters are performed as a part of the manufacturing process.

The techniques used for cylindrical projection of the frames from the plurality of camera sensors are described in co-pending U.S. patent application Ser. No. 14/757,716, filed on Dec. 23, 2015, and entitled "CYLINDRICAL PANORAMA", which is hereby incorporated by reference.

For Runtime Calibration the processor in the device itself generates the alignment and projection parameters on the fly by analyzing the scene being captured, by multiple cameras in the device.

Referring to FIG. 5, for the video from all the sensors to be projected, each sensor is provided its own projection parameters determined in step 502 to minimize the parallax disparity in the overlap region. In an embodiment, the projection techniques used may be but not limited to cylindrical, affine, bilinear and/or keystone etc.

During stitching, we first cylindrically warp each of the imagers based on unique cylindrical radius factor of each camera sensor.

In step 506, dynamic re-alignment is performed to fine tune factory calibration parameters. In step 508, ideal overlap region is identified to compute the stitching points. The overlap region is determined during the factory calibration, which is further fine-tuned to adapt to various environments in which the device is being used.

The overlap regions are dynamically adjusted by the camera system to adapt according to varying conditions like but not limited to room size etc. They can be made smaller or larger in value as compared to the factory calibrated value depending on the objects in the FOV of the camera system. These adjustments are made slowly enough so that they are not noticeable. The dynamic overlap width is determined by estimating the disparity measure at various positions from the calibrated width—the width is "opened" by 8 pixels to the left of the calibrated width and "closed" by 20 pixels to the right of the calibrated width to find the position at which the disparity is the minimum. The dynamic horizontal overlap width is modulated frame by frame over several frames until the horizontal overlap width matches the calculated width. This process is repeated continuously so that the camera can adjust to varying conditions dynamically.

In step 510, the optimum stitch line between the left and the right overlaps regions is calculated. The optimum stitch line is primarily based on the pixel differences in the overlap region, but a lot of other considerations go into determining the final stitch line as described in co-pending U.S. patent application Ser. No. 14/757,716, filed on Dec. 23, 2015, and entitled "CYLINDRICAL PANORAMA", which is hereby incorporated by reference.

Various other techniques can be used to determine the stitching points like creating a static stitch line which may be manually adjusted etc.

After the computation of the stitch line in 510, all the pixels in the entire overlap regions are adaptively blended based on pixel differences between co-sited pixels in the left and right overlap region in step 514.

In the overlap region, pixels to the left side of the stitch point on a row of the overlap, we first compute the linear average using the following formula:

$$linearAverage = leftOverlapPixel * dl + rightOverlapPixel * (currentOverlapWidth - dl)$$

$$blendedPixel = linearAverage * alpha + leftOverlapPixel * (1.0 - alpha)$$

Where, dl is the distance of the current pixel to the stitch point, leftOverlapPixel and rightOverlapPixel are co-sited in the overlap region, alpha is the weight estimated based on the color difference between left and right overlap regions at the co-sited pixel location.

Likewise, for pixels to the right side of the stitch point on a row of the overlap we calculate:

$$blendedPixel = linearAverage * alpha + rightOverlapPixel * (1.0 - alpha)$$

Therefore, in step 512 on each side of the stitch point, the original color values of the co-sited pixels in the left/right overlap regions are blended and the linear average of left and right overlap regions is computed, by using a weighting strategy which: chooses linear average when there is no color difference between co-sited pixels in the left and right overlap pixels, and applies a higher weight to left/right overlap pixels when there is a large difference between the colors of co-sited pixels in the left and right overlap region.

In step 516 the pixels around the stitch point are blended to make the stitch point seamless in the overlap region based on techniques as described in co-pending U.S. patent application Ser. No. 13/902,136 filed on May 24, 2013 and entitled "Locally Adaptive Luminance and Chrominance Blending in a Multiple Imager Video System" which is thereby incorporated by reference. In an embodiment, the color compensation and matching across the overlap region is performed using histogram matching and simple averaging.

In step 516, color differences between the adjacent cameras may be computed to adapt to the changing color differences in the scene. The average YCbCr values for the left and right overlap regions of a seam are calculated, and using the center imager as the reference, the left and right images' colors are adjusted so as to match the center imager.

The color and light response of each camera in the multiple sensor camera system is closely matched and made consistent with other camera in the device. In step 520, the same target brightness value and color response for all the cameras is set. The target brightness and color values may be computed by analyzing the independent camera response and performing weighted average. In an embodiment, methods like simple averaging, mean/median calculation to derive the target, adding fixed or independent offsets to the targets of each camera to bring their response close to each other may be used. These methods can be applied to discreet ISP paired with each sensor in which case brightness and color responses needs to be available as statistics to an external processor.

Numerous specific details may be set forth herein to provide a thorough understanding of a number of possible embodiments of a digital imaging system incorporating the present disclosure. It will be understood by those skilled in the art, however, that the embodiments may be practiced without these specific details. In other instances, well-known methods, procedures, components and circuits have not been described in detail so as not to obscure the embodiments. It can be appreciated that the specific structural and functional details disclosed herein may be representative and do not necessarily limit the scope of the embodiments.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The invention claimed is:

1. An image processing device, comprising:

a processor configured to:

read, in synchronization, a plurality of frames captured by a plurality of camera sensors;

calculate a plurality of alignment parameters and a plurality of projection parameters for the plurality of camera sensors, wherein the plurality of alignment parameters and the plurality of projection parameters are used in stitching images generated by the plurality of camera sensors;

apply a cylindrical mapping function to map the plurality of frames to a cylindrical image plane; and stitch the cylindrically mapped plurality of frames together in the cylindrical image plane based on the calculated plurality of projection parameters and the calculated alignment parameters, wherein for a given target alignment parameter beginning stitching with a horizontal overlap having a factory-calibrated width that is initially determined based on a factory alignment parameter and is subsequently adjusted by increasing or decreasing the width of the horizontal overlap based on objects detected in both a first region overlapping with corresponding adjacent camera sensors and a second region non-overlapping with the corresponding adjacent camera sensors within the field of view of each camera sensor of the plurality of camera sensors.

2. The image processing device according to claim 1, wherein for the given target alignment parameter, adjusting the horizontal overlap for each successive frame over the plurality of frames, the horizontal overlap is progressively increased or decreased to be nearer to the target alignment parameter until, for the final frame of the plurality of frames, the horizontal overlap becomes equal to the target alignment parameter.

3. The image processing device according to claim 1, further comprising the plurality of camera sensors configured to capture the plurality of frames.

4. The image processing device according to claim 1, wherein the processor is further configured to:

generate a plurality of frame read signals; and read, in synchronization, the plurality of frames based on the generated plurality of frame read signals.

5. The image processing device according to claim 1, wherein a projection parameter of the plurality of projection parameters for a corresponding camera sensor of the plurality of camera sensors is calculated to minimize parallax disparity in the horizontal overlap.

6. The image processing device according to claim 1, wherein the processor is further configured to dynamically adjust the horizontal overlap.

7. The image processing device according to claim 6, wherein the horizontal overlap is dynamically adjusted based on the objects in the field of view of the plurality of camera sensors.

8. The image processing device according to claim 1, wherein the plurality of projection parameters is determined based on factory calibration and runtime calibration.

9. The image processing device according to claim 1, wherein the processor is further configured to determine a stitch line between a left overlap region and a right overlap region for each of the plurality of frames.

10. The image processing device according to claim 9, wherein the stitch line is determined based on pixel differences between the left overlap region and the right overlap region.

11. The image processing device according to claim 9, wherein the processor is further configured to adjust the stitch line based on user input.

12. The image processing device according to claim 9, wherein the processor is further configured to blend the left overlap region and the right overlap region based on pixel differences between co-sited pixels in the left overlap region and the right overlap region.

13. The image processing device according to claim 1, wherein the processor is further configured to:

calculate color differences between adjacent camera sensors of the plurality of camera sensors; and control color and light response of each camera sensor of the plurality of camera sensors based on the calculated color differences.

14. The image processing device according to claim 1, wherein each of the plurality of frame read signals is initialized by a switch.

15. The image processing device according to claim 14, wherein the switch is controlled by a sensor control interface by broadcasting a control signal to the plurality of camera sensors.

16. An image processing method, comprising:

reading, in synchronization, a plurality of frames captured by a plurality of camera sensors;

calculating a plurality of alignment parameters and a plurality of projection parameters for the plurality of camera sensors, wherein the plurality of alignment parameters and the plurality of projection parameters are used in stitching images generated by the plurality of camera sensors;

applying a cylindrical mapping function to map the plurality of frames to a cylindrical image plane; and stitching the cylindrically mapped plurality of frames together in the cylindrical image plane based on the calculated plurality of projection parameters and the calculated alignment parameters, wherein for a given target alignment parameter beginning stitching with a horizontal overlap having a factory-calibrated width that is initially determined based on a factory alignment parameter and is subsequently adjusted by increasing or decreasing the width of the horizontal overlap based on objects detected in both a first region overlapping with corresponding adjacent camera sensors and a second region non-overlapping with the corresponding adjacent camera sensors within the field of view of each camera sensor of the plurality of camera sensors.

17. The image processing method according to claim 16, wherein for the given target alignment parameter, adjusting the horizontal overlap for each successive frame over the plurality of frames, the horizontal overlap is progressively increased or decreased to be nearer to the target alignment parameter until for the final frame of the plurality of frames, and the horizontal overlap is equal to the target alignment parameter.

18. A non-transitory computer readable storage medium, having stored thereon, a set of computer-executable instructions that causes a computer to perform the steps comprising:

reading, in synchronization, a plurality of frames captured by a plurality of camera sensors;

calculating a plurality of alignment parameters and a plurality of projection parameters for the plurality of camera sensors, wherein the plurality of alignment parameters and the plurality of projection parameters are used in stitching images generated by the plurality of camera sensors;

applying a cylindrical mapping function to map the plurality of frames to a cylindrical image plane; and stitching the cylindrically mapped plurality of frames together in the cylindrical image plane based on the calculated plurality of projection parameters and the calculated alignment parameters, wherein for a given target alignment parameter beginning stitching with a horizontal overlap having a factory-calibrated width that is initially determined based on a factory alignment parameter and is subsequently adjusted by increasing or decreasing the width of the horizontal overlap based on objects detected in both a first region overlapping with corresponding adjacent camera sensors and a second region non-overlapping with the corresponding adjacent camera sensors within the field of view of each camera sensor of the plurality of camera sensors.

19. The image processing device according to claim 1, wherein the horizontal overlap is adjusted for each successive frame over the plurality of frames, and the horizontal overlap is progressively increased or decreased to be nearer to the given target alignment parameter until for a final frame of the plurality of frames, the horizontal overlap is equal to the given target alignment parameter.

* * * * *